United States Patent
Buddenmeier et al.

(10) Patent No.: US 6,714,661 B2
(45) Date of Patent: Mar. 30, 2004

(54) METHOD AND SYSTEM FOR CUSTOMIZING FACIAL FEATURE TRACKING USING PRECISE LANDMARK FINDING ON A NEUTRAL FACE IMAGE

(75) Inventors: Ulrich F. Buddenmeier, Venice, CA (US); Hartmut Neven, Santa Monica, CA (US)

(73) Assignee: Nevengineering, Inc., Santa Monica, CA (US)

( * ) Notice: Subject to any disclaimer, the term of this patent is extended or adjusted under 35 U.S.C. 154(b) by 0 days.

(21) Appl. No.: 09/915,205

(22) Filed: Jul. 24, 2001

(65) Prior Publication Data

US 2002/0015512 A1 Feb. 7, 2002

Related U.S. Application Data

(63) Continuation-in-part of application No. 09/188,079, filed on Nov. 6, 1998, now Pat. No. 6,272,231.
(60) Provisional application No. 60/220,288, filed on Jul. 24, 2000.

(51) Int. Cl.[7] .................................................. G06K 9/00
(52) U.S. Cl. ........................ 382/103; 382/118; 382/209; 382/240; 345/473
(58) Field of Search ................................. 382/103, 100, 382/240, 232, 118, 209, 199; 348/169; 345/473

(56) References Cited

U.S. PATENT DOCUMENTS

| | | |
|---|---|---|
| 4,725,824 A | 2/1988 | Yoshioka |
| 4,805,224 A | 2/1989 | Koezuka et al. |
| 4,827,413 A | 5/1989 | Baldwin et al. |
| 5,159,647 A | 10/1992 | Burt |
| 5,168,529 A | 12/1992 | Peregrim et al. |
| 5,187,574 A | 2/1993 | Kosemura et al. |

(List continued on next page.)

FOREIGN PATENT DOCUMENTS

| | | |
|---|---|---|
| EP | 0807902 A2 | 11/1997 |
| WO | WO99/53443 | 10/1999 |

OTHER PUBLICATIONS

Wiskott et al, Phantom faces for face analysis, 1997, Institute for neuroinformatic, Germany pp. 308–311.*

Wiskott et al, Face recognition by elastic bunch graph matching, 1997, IEEE, pp. 775–779.*

Tomasi, C., et al., "Stereo Without Search", *Proceedings of European Conference on Computer Vision*, Cambridge, UK, 1996, 14 pp. (7 sheets).

(List continued on next page.)

*Primary Examiner*—Bhavesh M. Mehta
*Assistant Examiner*—Barry Choobin
(74) *Attorney, Agent, or Firm*—Robroy R. Fawcett

(57) ABSTRACT

The present invention is embodied in a method and system for customizing a visual sensor for facial feature tracking using a neutral face image of an actor. The method may include generating a corrector graph to improve the sensor's performance in tracking an actor's facial features.

24 Claims, 3 Drawing Sheets

U.S. PATENT DOCUMENTS

| | | | |
|---|---|---|---|
| 5,220,441 | A | 6/1993 | Gerstenberger |
| 5,280,530 | A | 1/1994 | Trew et al. |
| 5,333,165 | A | 7/1994 | Sun |
| 5,383,013 | A | 1/1995 | Cox |
| 5,430,809 | A | 7/1995 | Tomitaka |
| 5,432,712 | A | 7/1995 | Chan |
| 5,511,153 | A | 4/1996 | Azarbayejani et al. |
| 5,533,177 | A | 7/1996 | Wirtz et al. |
| 5,550,928 | A | 8/1996 | Lu et al. |
| 5,581,625 | A | 12/1996 | Connell |
| 5,588,033 | A | 12/1996 | Yeung |
| 5,680,487 | A | 10/1997 | Markandey |
| 5,699,449 | A | 12/1997 | Javidi |
| 5,714,997 | A | 2/1998 | Anderson |
| 5,715,325 | A | 2/1998 | Bang et al. |
| 5,719,951 | A * | 2/1998 | Shackleton et al. ......... 382/118 |
| 5,719,954 | A | 2/1998 | Onda |
| 5,736,982 | A | 4/1998 | Suzuki et al. |
| 5,764,803 | A | 6/1998 | Jacquin et al. |
| 5,774,591 | A | 6/1998 | Black et al. |
| 5,802,220 | A | 9/1998 | Black et al. |
| 5,809,171 | A | 9/1998 | Neff et al. |
| 5,828,769 | A | 10/1998 | Burns |
| 5,835,616 | A * | 11/1998 | Lobo et al. ................. 382/118 |
| 5,917,937 | A | 6/1999 | Szeliski et al. |
| 5,982,853 | A | 11/1999 | Liebermann |
| 5,995,119 | A | 11/1999 | Cosatto et al. |
| 6,011,562 | A | 1/2000 | Gagné et al. |
| 6,031,539 | A | 2/2000 | Kang et al. |
| 6,044,168 | A | 3/2000 | Tuceryan et al. |
| 6,052,123 | A | 4/2000 | Lection et al. |
| 6,222,939 | B1 * | 4/2001 | Wiskott et al. ............. 382/209 |
| 6,301,370 | B1 * | 10/2001 | Steffens et al. ............. 382/103 |

OTHER PUBLICATIONS

Triesch, J., et al, "Robust Classification of Hand Postures Against Complex Backgrounds", *Proceedings of the Second International Conference on Automatic Face and Gesture Recognition,* Killington, VT, Oct. 1996, 6 pp.

Turk, M., et al, "Eigenfaces for Recognition", *Journal of Cognitive Neuroscience,* vol. 3, No 1, pp. 71–86, 1991.

Wiskott, L., et al, "Face Recognition and Gender Determination", *Proceedings of International Workshop on Automatic Face and Gesture Recognition,* pp. 92–97, Zurich CH, Jun. 26, 1995.

Wiskott, L., et al, "Face Recognition by Elastic Bunch Graph Matching", *Internal Report, IR–INI 96–08,* Institut fur Neuroinformatik, Ruhr–Universitat, Bochum, pp. 1–21, Apr. 1996.

Wiskott, L., "Labeled Graphs and Dynamic Link Matching for Face Recognition and Scene Analysis", *Verlag Harr Deutsch,* Thun–Frankfurt am Main. Reihe Physik, Dec. 1995, pp. 1–109.

Wiskott, L., "Phanton Faces for Face Analysis". *Proceedings of 3rd Joint Symposium on Neural Computation,* Pasadena, CA, vol. 6, pp. 46–52, Jun. 1996.

Wiskott, L., "Phanton Faces for Face Analysis". *Internal Report, IR–INI 96–06,* Institut fur Neoroinformatik, Ruhr–Universitat, Bochum, Germany, Apr. 1996, 12 pp.

Wiskott, L. "Phantom Faces for Face Analysis", *Pattern Recognition,* vol. 30, No. 6, pp. 837–846, 1997.

Wiskott, L., et al, "Face Recognition by Elastic Bunch Graph Matching", *IEEE Transactions on Pattern Analysis and Machine Intelligence,* 19(7), pp. 775–779, 1997.

Wong, R., et al, "PC–Based Human Face Recognition System", *IEEE,* pp. 641–644, 1992.

Wurtz, R., "Object Recognition Robust Under Translations, Deformations, and Changes in Background", *IEEE Transactions on Patern Analysis and Machine Intelligence,* vol. 19, No. 7, Jul. 1997, pp. 769–775.

Wurtz, R., et al, "Corner Detection in Color Images by Multiscale Combination of End–stopped Cortical Cells", *Artificial Neural Networks—ICANN '97,* Lecture Notes in Computer Science, vol. 1327, pp. 901–906, Springer–Verlag, 1997.

Yao, Y., et al, "Tracking a Dynamic Set of Feature Points", *IEEE Transactions on Image Processing,* vol. 4, No. 10, Oct., 1995, pp. 1382–1394.

Kruger, N., et al, "Object Recognition with a Sparse and Autonomously Learned Representation Based on Banana Wavelets", *Internal Report 96–11,* Institut fur Neuroinformatik, Dec. 96, pp. 1–24.

Kruger, N., et al, "Object Recognition with Banana Wavelets", *European Symposium on Artificial Neural Networks* (ESANN97), 1997, 6 pp.

Kruger, N., "An Algorithm for the Learning of Weights in Discrimination Functions Using a priori Constraints", *IEEE Transactions on Pattern Analysis and Machine Intelligence,* vol. 19, No. 7, Jul. 1997, pp. 764–768.

Lades, M., et al, "Distortion Invarient Object Recognition in the Dynamic Link Architecture", *IEEE Transactions on Computers,* vol. 42, No. 3, 1993, 11 pp.

Luong, Q. T., et al, "The Fundamental Matrix, Theory, Algorithm, and Stability Analysis", *INRIA,* 1993, pp. 1–46.

Manjunath, B. S., et al, "A Feature Based Approach to Face Recognition", *In Proceedings IEEE Conference on Computer Vision and Pattern Recognition,* pp. 373–378, 3/92.

Mauer, T., et al, "Single–View Based Recognition of Faces Rotated in Depth", In *Proceedings of the International Workshop on Automatic Face and Gesture Recognition,* pp. 248–253, Zurich, CH, Jun. 26, 1995.

Mauer, T., et al, "Learning Feature Transformations to Recognize Faces Rotated in Depth", In *Proceedings of the International Conference on Artificial Neural Networks,* vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition,* Oct. 14–16, 1996, pp. 176–181.

Maybank, S. J., et al, "A Theory of Self–Calibration of a Moving Camera", *International Journal of Computer Vision,* 8(2), pp. 123–151, 1992.

McKenna, S.J., et al, Tracking Facial Feature Points With Gabor Wavelets and Shape Models, (*publication & date unknown*), 6 pp.

Okada, K., et al, "The Bochum/USC Face Recognition System", 19 pp. (*publication & date unknown*).

Okutomi, M., et al, "A Multiple–Baseline Stereo", *IEEE Trans. on Pattern Analysis and Machine Intelligence,* vol. 15, No. 4, pp. 353–363, Apr. 1993.

Peters, G., et al, "Learning Object Representations by Clustering Banana Wavelet Responses", *Tech. Report IR–INI 96–09,* Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy,* CTAC International Technology Symposium, Aug. 18–22, 1997, 10 pages.

Pighin, F, et al, "Synthesizing Realistic Facial Expressions from Photographs", In *SIGGRAPH 98 Conference Proceedings*, pp. 75–84, Jul. 1998.

Roy, S., et al, "A Maximum Flow Formulation of the N–Camera Stereo Correspondence Problem", *IEEE, Proceedings of International Conference on Computer Vision*, Bombay, India, Jan. 1998, pp. 1–6.

Sara, R. et al "3–D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision, ICCV '98*, pp. 811–817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan–Apr. 1998.

Theimer, W. M., et al, "Phase–Based Binocular Vergence Control and Depth Reconstruction using Active Vision", *CVGIR: Image Understanding*, vol. 60, No. 3, Nov. 1994, pp. 343–358.

Fleet, D.J., et al., "Computation of Component Image Velocity from Local Phase Information", *Int., J. Of Computer Vision*, 5:1, pp. 77–104 (1990).

Fleet, D.J., et al. *Measurement of Image Velocity*, Kluwer Academic Press, Boston, pp. I–203, 1992.

Hall, E.L., "Computer Image Processing And Recognition", Academic Press 1979, 99. 468–484.

Hong, H.,et al., "Online Facial Recognition based on Personalized Gallery", Proceedings of Int'l Conference On Automatic Face And Gesture Recognition, pp. 1–6, Japan Apr. 1997.

Kolocsai, P., et al, Statistical Analysis of Gabor–Filter Representation, *Proceedings of International Conference on Automatic Face and Gesture Recognition*, 1997, 4 pp.

Kruger, N., "Visual Learning with a priori Constraints", *Shaker Verlag*, Aachen, Germany, 1998, pp. 1–131.

Kruger, N., et al "Principles of Cortical Processing Applied to and Motivated by Artificial Object Recognition", Institut fur Neuroinformatik, *Internal Report 97–17*, Oct. 97, pp. 1–12.

Kruger, N., et al, "Autonomous Learning of Object Representations Utilizing Self–Controlled Movements", 1998, *Proceedings of NN98*, 5 pp.

International Search Report for PCT/US99/07935.

Akimoto, T., et al., "Automatic Creation of Facial 3D Models", IEEE Computer Graphics & Apps., pp. 16–22, Sep. 1993.

Ayache, N. et al., "Rectification of Images for Binocular and Trinocular Stereovision", Proc. Of 9th Int'l., Conference on Pattern Recognition, 1, pp. 11–16, Italy, 1988.

Belhumeur, P., "A Bayesian Approach to Binocular Stereopsis", *Int'l. J. Of Computer Vision*, 19 (3), Pp.237–260, 1996.

Beymer, D. J., "Face Recognition Under Varying Pose", MIT A.I. Lab, Memo No. 1461,pp. 1–13, 12/93.

Beymer, D.J., "Face Recognition Under Varying Pose", MIT A.I. Lab. Research Report, 1994, pp. 756–761.

Buhmann, J. et al., "Distortion Invariant Object Recognition By Matching Hierarchically Labeled Graphs", In Proceedings IJCNN Int'l Conf. Of Neural Networks, Washington, D.C. Jun. 1989, pp. 155–159.

DeCarlo, D., et al., "The integration of Optical Flow and Deformable Models with Applications to Human Face Shape and Motion Estimation", pp. 1–15, In Proc. CVPR '96, pp. 231–238 (published)[TM Sep. 18, 1996].

Devemay, F. et al., "Computing Differential Properties of 3–D Shapes from Steroscopic Images without {3–D} Models", INRIA, RR–2304, pp. 1–28, Sophia, Antipolis, 1994.

Dhond, U., "Structure from Stereo: a Review", IEEE Transactions on Systems, Man, and Cybernetics, 19(6), pp. 1489–1510, 1989.

Notification of Transmittal of the International Search Report or the Declaration, International Search Report for PCT/US02/23973, mailed Nov. 18, 2002.

Valente, Stephanie et al., "A Visual Analysis/Synthesis Feedback Loop for Accurate Face Tracking", Signal Processing Image Comunication, Elsevier Science Publishers, vol. 16, No. 6, Feb. 2001, pp. 585–608.

Yang, Tzong Jer, "Face Analysis and Synthesis", Jun. 1, 1999, Retrieved from Internet, http://www.cmlab.csie.ntu.edu.tw/ on Oct. 25, 2002, 2 pg.

Yang, Tzong Jer, "VR–Face: An Operator Assisted Real–Time Face Tracking System", Communication and Multimedia Laboratory, Dept. of Computer Science and Information Engineering, National Taiwan University, Jun. 1999, pp. 1–6.

International Search Report for PCT/US01/23337

* cited by examiner

METHOD AND SYSTEM FOR CUSTOMIZING FACIAL FEATURE TRACKING USING PRECISE LANDMARK FINDING ON A NEUTRAL FACE IMAGE

CROSS-REFERENCE TO RELATED APPLICATIONS

This application claims priority under 35 U.S.C. §119(e)(1) and 37 C.F.R. §1.78(a)(4) to U.S. provisional application serial No. 60/220,288, entitled METHOD AND SYSTEM FOR CUSTOMIZING FACIAL FEATURE TRACKING USING PRECISE LANDMARK FINDING ON A NEUTRAL FACE IMAGE and filed Jul. 24, 2000; and claims priority under 35 U.S.C. §120 and 37 C.F.R. §1.78(a)(2) as a continuation-in-part to U.S. patent application Ser. No. 09/188,079, entitled WAVELET-BASED FACIAL MOTION CAPTURE FOR AVATAR ANIMATION and filed Nov. 6, 1998 now U.S. Pat. No. 6,272,231. The entire disclosure of U.S. patent application Ser. No. 09/188,079 is incorporated herein by reference.

BACKGROUND OF THE INVENTION

The present invention relates to avatar animation, and more particularly, to facial feature tracking.

Virtual spaces filled with avatars are an attractive the way to allow for the experience of a shared environment. However, animation of a photo-realistic avatar generally requires robust tracking of an actor's movements, particularly for tracking facial features.

Accordingly, there exists a significant need for improved facial feature tracking. The present invention satisfies this need.

SUMMARY OF THE INVENTION

The present invention is embodied in a method, and related system, for customizing a visual sensor using a neutral face image of an actor. The method includes capturing a front neutral face image of an actor and automatically finding facial feature locations on the front neutral face image using elastic bunch graph matching. Nodes are automatically positioned at the facial feature locations on the front neutral face image of the actor. The node positions are then manually corrected on front neutral face image of the actor.

Further, the method may include generating a corrector graph based on the corrected node positions.

Other features and advantages of the present invention should be apparent from the following description of the preferred embodiments taken in conjunction with the accompanying drawings, which illustrate, by way of example, the principles of the invention.

DETAILED DESCRIPTION OF THE PREFERRED EMBODIMENTS

The present invention is embodied in a method and system for customizing a visual sensor for facial feature tracking using a neutral face image of an actor. The method may include generating a corrector graph to improve the sensor's performance in tracking an actor's facial features.

Figure 1:
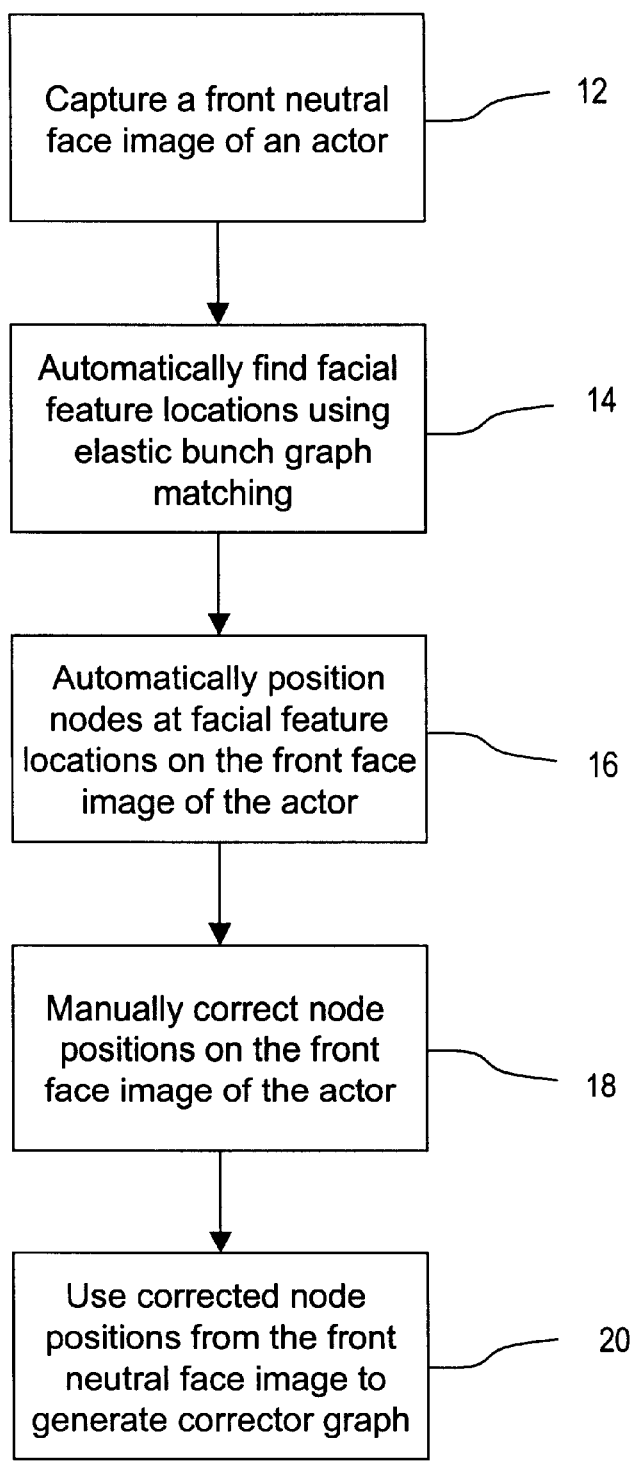
FIG. 1 is a flow diagram for illustrating a method for customizing facial feature tracking using precise landmark finding on a neutral face image, according to the present invention.
Figure 2:
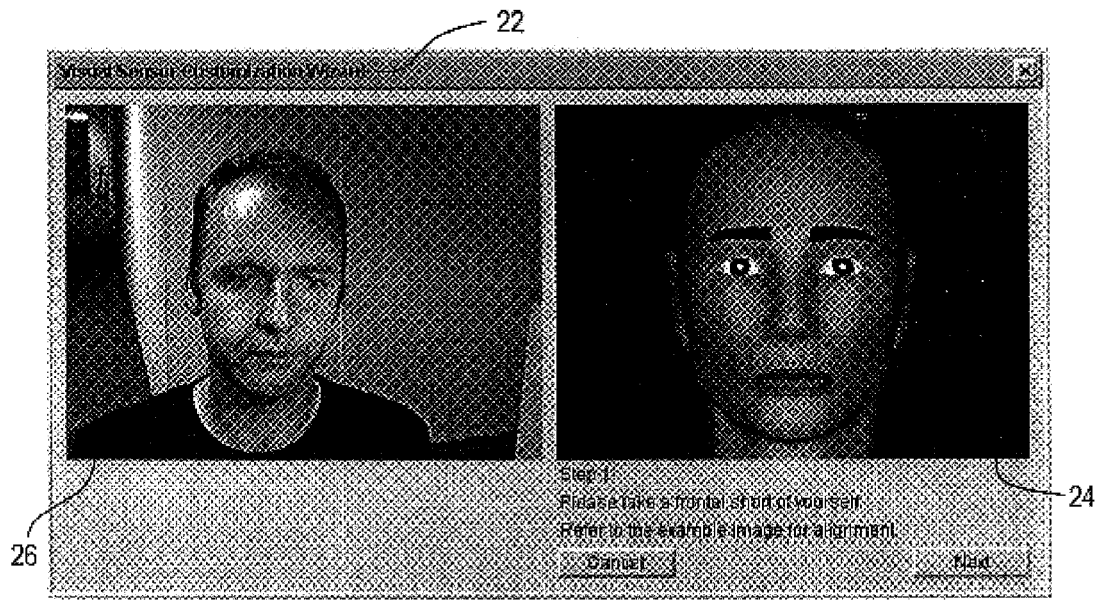
FIG. 2 is an image of a visual sensor customization wizard having a camera image of an actor and a generic model image.
Figure 3:
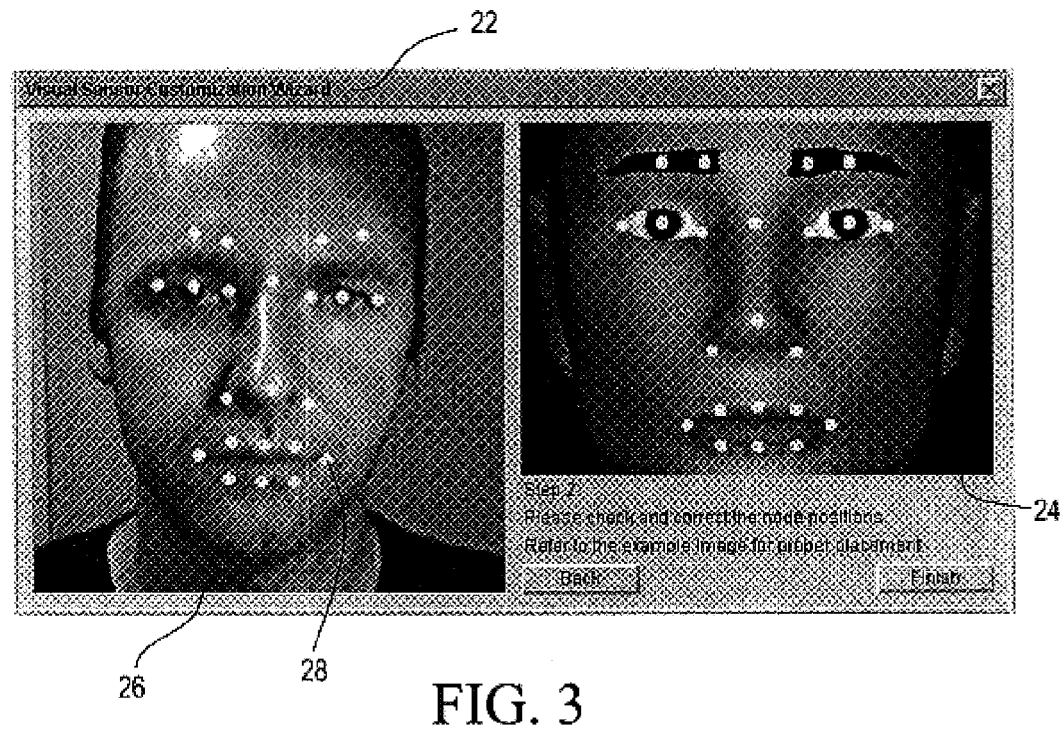
FIG. 3 is an image of a visual sensor customization wizard after automatic sensing and placement of node locations on a camera image of an actor's face.

As shown in FIG. 1, the method captures a front face image of the actor (block 12). The front neutral face image may be captured with the assistance of a visual sensor customization wizard 22, shown in FIG. 2. An example image 24 is shown to the actor to indicate the alignment of the captured image 26. Next, facial feature locations are automatically found using elastic bunch graph matching (block 14). Facial feature finding using elastic bunch graph matching is described in U.S. patent application Ser. No. 09/188,079. In the elastic graph matching technique, an image is transformed into Gabor space using a wavelet transformations based on Gabor wavelets. The transformed image is represented by complex wavelet component values associated with each pixel of the original image. As shown in FIG. 3, nodes 28 are automatically placed on the front face image at the locations of particular facial features (block 16). Because of particular image characteristics of the actor, a facial feature graph placed over the actor's front face image may have nodes locations that are not properly placed on the front face image. For example, the four nodes for the actor's eyebrows are placed slightly above the eyebrows on the front face image.

Figure 4:
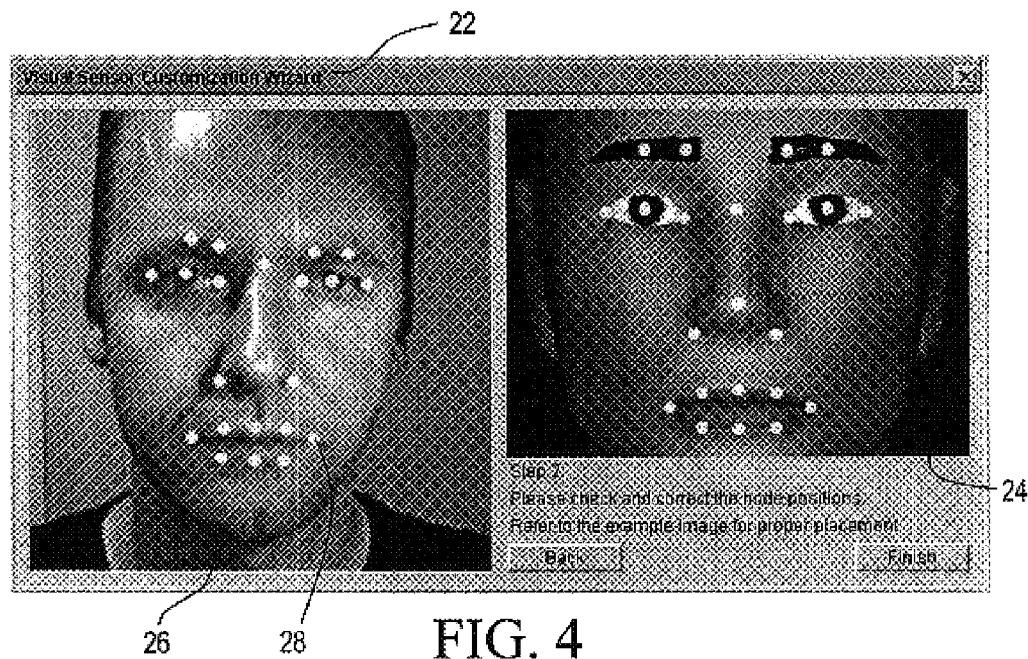
FIG. 4 is an image of a visual sensor customization wizard having corrected node positions for generating a corrector graph, according to the present invention.

The system operator may use the visual sensor customization wizard 22 to pick and move the nodes 28. The nodes are manually moved on the neutral face image 26 using a pointing device, such as a mouse, to select and drag a node to a desired location (block 18). For example, as shown in FIG. 4, node placement on the eyebrows of the actor's image has been adjusted to more closely aligned with the actor's eyebrows in accordance with the example image 24.

Figure 5:
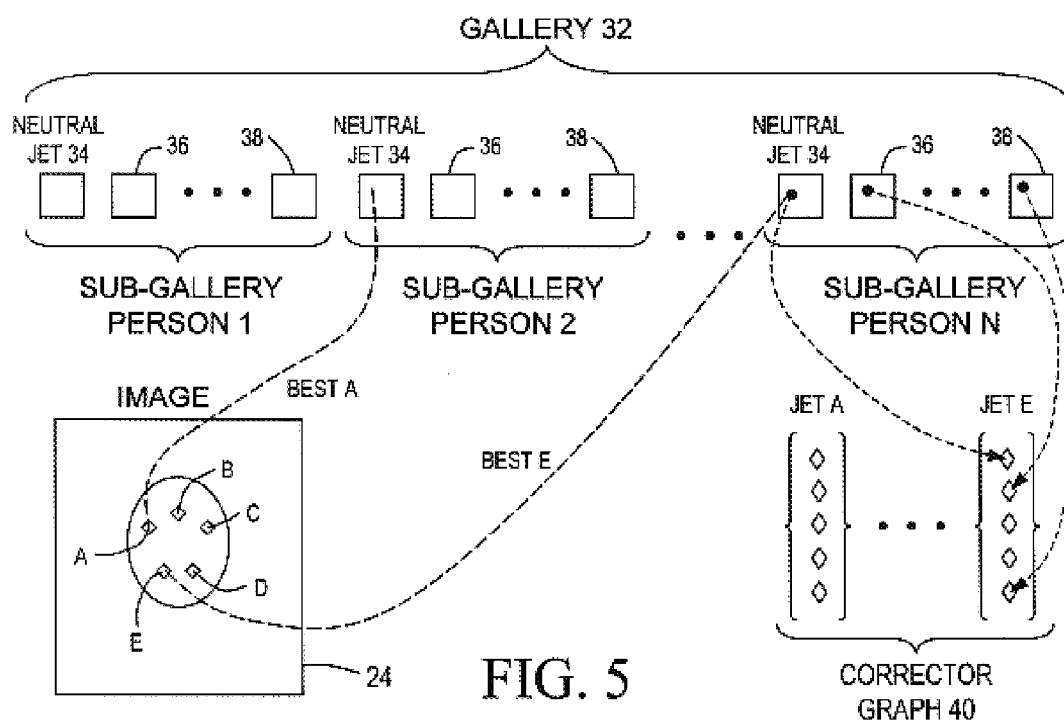
FIG. 5 is a block diagram of a technique for generating a corrector graph using a neutral face image, according to the present invention.

As shown in FIG. 5, after the nodes 28 for features, A through E, are correctly placed on the front neutral face image 24, image jets are recalculated for each facial feature and may be compared to corresponding jets in a gallery 32 of a bunch graph. The bunch graph gallery includes sub-galleries of a large number N of persons. Each person in the sub-gallery includes jets for a neutral face image 34 and for expressive facial images, 36 through 38, such as a smiling face or a face showing exclamation. Each feature jet from the corrected actor image 24 is compared with the corresponding feature jet from the neutral jets in the several sub-galleries. The sub-gallery neutral jet for a feature (i.e., feature A) that most closely matches the jet for the image feature A is selected for generating a jet gallery for the feature A of a corrector graph 40. As a more particular example, for the feature E, the sub-gallery for person N has a neutral jet for feature E that most closely corresponds to the jet for feature E from the neutral image 24. The corrector graph jets for facial feature E are generated using the jet for feature E from the neutral jets along with the jets for feature E from each of the expressive feature jets, 36 through 38, from the sub-gallery N. Accordingly, the corrector graph 40 is formed using the best jets, with respect to the neutral face image 24, from the gallery 32 forming the bunch graph.

The resulting corrector graph 40 provides a much more robust sensor for tracking node locations. A custom facial feature tracking sensor incorporating the corrector graph may provide a more photo-realistic avatar and an enhanced virtual space experience.

Although the foregoing discloses the preferred embodiments of the present invention, it is understood that those skilled in the art may make various changes to the preferred embodiments without departing from the scope of the invention. The invention is defined only by the following claims.

We claim:

1. A method for customizing facial feature tracking, comprising:

capturing a front neutral face image of an actor;

automatically finding facial feature locations on the front neutral face image using elastic bunch graph matching;

automatically positioning nodes at the facial feature locations on the front neutral face image of the actor; and manually correcting the positioning of the nodes on front neutral face image of the actor.

2. A method for customizing facial feature tracking as defined in claim 1, further comprising generating a corrector graph based on the corrected node positions.

3. A system for customizing facial feature tracking, comprising:

means for capturing a front neutral face image of an actor;

means for automatically finding facial feature locations on the front neutral face image using elastic bunch graph matching;

means for automatically positioning nodes at the facial feature locations on the front neutral face image of the actor; and means for manually correcting the positioning of the nodes on front neutral face image of the actor.

4. A system for customizing facial feature tracking as defined in claim 3, further comprising means for generating a corrector graph based on the corrected node positions.

5. A method for customizing facial feature tracking, comprising:

capturing a front neutral face image of an actor;

automatically finding facial feature locations on the front neutral face image using image analysis based on wavelet component values generated from wavelet transformations of the front neutral face image;

automatically positioning nodes at the facial feature locations on the front neutral face image of the actor; and manually correcting the positioning of the nodes on front neutral face image of the actor.

6. A method for customizing facial feature tracking as defined in claim 5, wherein the wavelet transformations use Gabor wavelets.

7. A method for customizing facial feature tracking, comprising:

capturing a front neutral face image of an actor;

finding facial feature locations on the front neutral face image using image analysis based on wavelet component values generated from wavelet transformations of the front neutral face image; and generating a corrector graph for expressive facial features based on the wave component values at the facial feature locations on the front neutral face image.

8. A method for customizing facial feature tracking as defined in claim 7, wherein the wavelet transformations use Gabor wavelets.

9. A method for customizing facial feature tracking as defined in claim 1, wherein manually correcting the positioning of the nodes is performed after the automatically positioning of the nodes at the facial features.

10. A method for customizing facial feature tracking as defined in claim 1, wherein manually correcting the positioning of the nodes is performed using a visual sensor customization wizard presenting the captured front neutral face image of the actor showing the positioning of the nodes at the facial feature locations on the front neutral face image of the actor, and presenting an example image to indicate proper node positioning.

11. A method for customizing facial feature tracking as defined in claim 2, wherein the corrector graph associates jets for facial features from a front neutral face image with respective jets for facial features from expressive face images.

12. A method for customizing facial feature tracking as defined in claim 2, further comprising tracking facial features of the actor using the corrector graph.

13. A system for customizing facial feature tracking as defined in claim 3, wherein the means for manually correcting the positioning of the nodes includes a visual sensor customization wizard for presenting the captured front neutral face image of the actor showing the positioning of the nodes at the facial feature locations on the front neutral face image of the actor, and presenting an example image to indicate proper node positioning.

14. A system for customizing facial feature tracking as defined in claim 4, wherein the corrector graph associates jets for facial features from a front neutral face image with respective jets for facial features from expressive face images.

15. A system for customizing facial feature tracking as defined in claim 4, further comprising means for tracking facial features of the actor using the corrector graph.

16. A method for customizing facial feature tracking as defined in claim 5, wherein manually correcting the positioning of the nodes is performed after the automatically positioning of the nodes at the facial features.

17. A method for customizing facial feature tracking as defined in claim 5, wherein manually correcting the positioning of the nodes is performed using a visual sensor customization wizard presenting the captured front neutral face image of the actor showing the positioning of the nodes at the facial feature locations on the front neutral face image of the actor, and presenting an example image to indicate proper node positioning.

18. A method for customizing facial feature tracking as defined in claim 5, further comprising generating a corrector graph based on the corrected node positions.

19. A method for customizing facial feature tracking as defined in claim 18, wherein the corrector graph associates jets for facial features from a front neutral face image with respective jets for facial features from expressive face images.

20. A method for customizing facial feature tracking as defined in claim 18, further comprising tracking facial features of the actor using the corrector graph.

21. A system for customizing facial feature tracking as defined claim 7, wherein the means for manually correcting the positioning of the nodes includes a visual sensor customization wizard for presenting the captured front neutral face image of the actor showing the positioning of the nodes at the facial feature locations on the front neutral face image of the actor, and presenting an example image to indicate proper node positioning.

22. A system for customizing facial feature tracking as defined in claim 7, further comprising means for generating a corrector graph based on the corrected node positions.

23. A system for customizing facial feature tracking as defined in claim 22, wherein the corrector graph associates jets for facial features from a front neutral face image with respective jets for facial features from expressive face images.

24. A system for customizing facial feature tracking as defined in claim 22, further comprising means for tracking facial features of the actor using the corrector graph.

* * * * *